United States Patent [19]
Roberts

[11] 3,855,972
[45] Dec. 24, 1974

[54] ROTARY COMBUSTION ENGINE WITH IMPROVED FIRING SYSTEM

[75] Inventor: Thomas C. Roberts, Ridgewood, N.J.

[73] Assignee: Curtis-Wright Corporation

[22] Filed: Sept. 28, 1973

[21] Appl. No.: 401,562

[52] U.S. Cl............. 123/8.09, 123/32 SJ, 313/141, 431/266
[51] Int. Cl....................... F02b 53/10, F02b 53/12
[58] Field of Search............. 123/8.09, 8.13, 32 SJ, 123/32 SPA, 32 SP; 60/39.82 S; 313/141; 431/266

[56] References Cited
UNITED STATES PATENTS 2,391,220  12/1945  Bech.................. 123/32 SP UX
2,795,214  6/1957  Shook.................. 123/32 SP UX Primary Examiner—William L. Freeh
Assistant Examiner—Michael Koczo, Jr.
Attorney, Agent, or Firm—Raymond P. Wallace

[57] ABSTRACT

A rotary combustion engine with fuel injection into the combustion chamber, wherein the positive electrode of the spark plug strikes a spark during the period of fuel injection through the path of injected fuel to a negative electrode mounted on the injector nozzle, producing positive ignition even during very lean operation, and reducing spark plug fouling. The electrode borne by the injector is fabricated of long-lasting material and is formed with two prongs, the spark plug electrode being interjacent between the prongs, so as to permit adjustment to alter the spark gap.

8 Claims, 4 Drawing Figures

ROTARY COMBUSTION ENGINE WITH IMPROVED FIRING SYSTEM

CROSS-REFERENCE TO RELATED APPLICATION

This invention is an improvement on one embodiment of the invention described and claimed in the copending application of Charles Jones, Ser. No. 299,811, filed Oct. 24, 1972, now U.S. Pat. No. 3,795,227, and having a common assignee.

BACKGROUND OF THE INVENTION

This invention relates to rotary combustion engines, and more particularly to the means of firing fuel injected into the combustion chamber.

Rotary engines are known in which a fuel injector and a spark plug in close proximity to each other are positioned in a recess in the peripheral housing, as shown in U.S. Pat. No. 3,246,636. However, as shown in that patent the fuel spray from the injector had to clear the spark plug, and therefore, at idling speeds when there is relatively little turbulence of the compressed air in the combustion chamber and the amount of fuel injected is minimal, a combustible mixture may not reach the spark and missing may result. Further, the arrangement shown in the patent requires a relatively large cavity for the injector and spark plug, with a large orifice into the combustion chamber. The large volume of the cavity lowers the compression ratio, and the large orifice provides a considerable leakage path across the leading apex seal of the compression chamber as it crosses the aperture.

The invention of the copending application Ser. No. 299,811 solved the problem of obtaining positive ignition by making the grounded injector nozzle the negative electrode with the positive electrode of the spark plug firing directly to the nozzle, and by providing a light-off jet from the nozzle passing through the spark path. However, that arrangement required that the single spark plug electrode be positioned adjacent to the injector at a distance comprising the optimum spark gap, which in turn required that the plug be screwed down to a predetermined torque against its gasket, and that gaskets should all have the same compressibility. If the gap enlarged owing to erosion of the injector nozzle, the nozzle would have to be replaced, and they are expensive items. To avoid such expense there was provided a replaceable split ring surrounding the nose of the nozzle, with the light-off jet discharging through the split and the plug firing to the ring ends. This still required precise torquing of the spark plug, no adjustment of the gap was possible, and the arc was struck to the sharp edges of the ring ends which could rapidly erode and enlarge the gap.

SUMMARY

The present invention obviates the foregoing difficulties by providing a fuel-injected rotary engine with an igniting arrangement wherein the nose of the injector nozzle bears a U-shaped negative electrode with the legs thereof projecting transversely to the axis of the injector, and the spark plug has a single, positive electrode positioned interjacent between the legs of the U-shaped electrode and firing thereto. One jet aperture of the injector is positioned and oriented to discharge a fuel jet directly across the spark path for positive ignition at all conditions of operation. The negative electrode may be adjusted to alter the spark gap by bending the legs of the U toward or away from the positive electrode, in much the same manner as the gap is adjusted in a conventional spark plug.

Thus, the plug may be installed with only the usual care that it shall be tightly sealed against its gasket. The U-shaped electrode is formed of a material having a life many times greater than that of a spark plug, so that the need of replacement is infrequent, and the negative electrode may last the life of the engine.

It is an object of this invention to provide a fuel-injected rotary engine with an improved firing system.

It is another object to provide such an engine having a negative electrode mounted on the fuel injector, the negative electrode being adjustable to provide an optimum spark gap.

A further object is to provide such an engine in which the life of the negative electrode is much greater than that of the spark plug and the need for replacement of the negative electrode is infrequent.

Other objects and advantages will become apparent on reading the following specification in connection with the accompanying drawings.

DESCRIPTION OF A PREFERRED EMBODIMENT

Although the invention will be described primarily in terms of its installation in a rotary engine of trochoidal type, it is applicable to rotary engines of other types, such as those having vaned rotors, and also to reciprocating engines.

Figure 1:
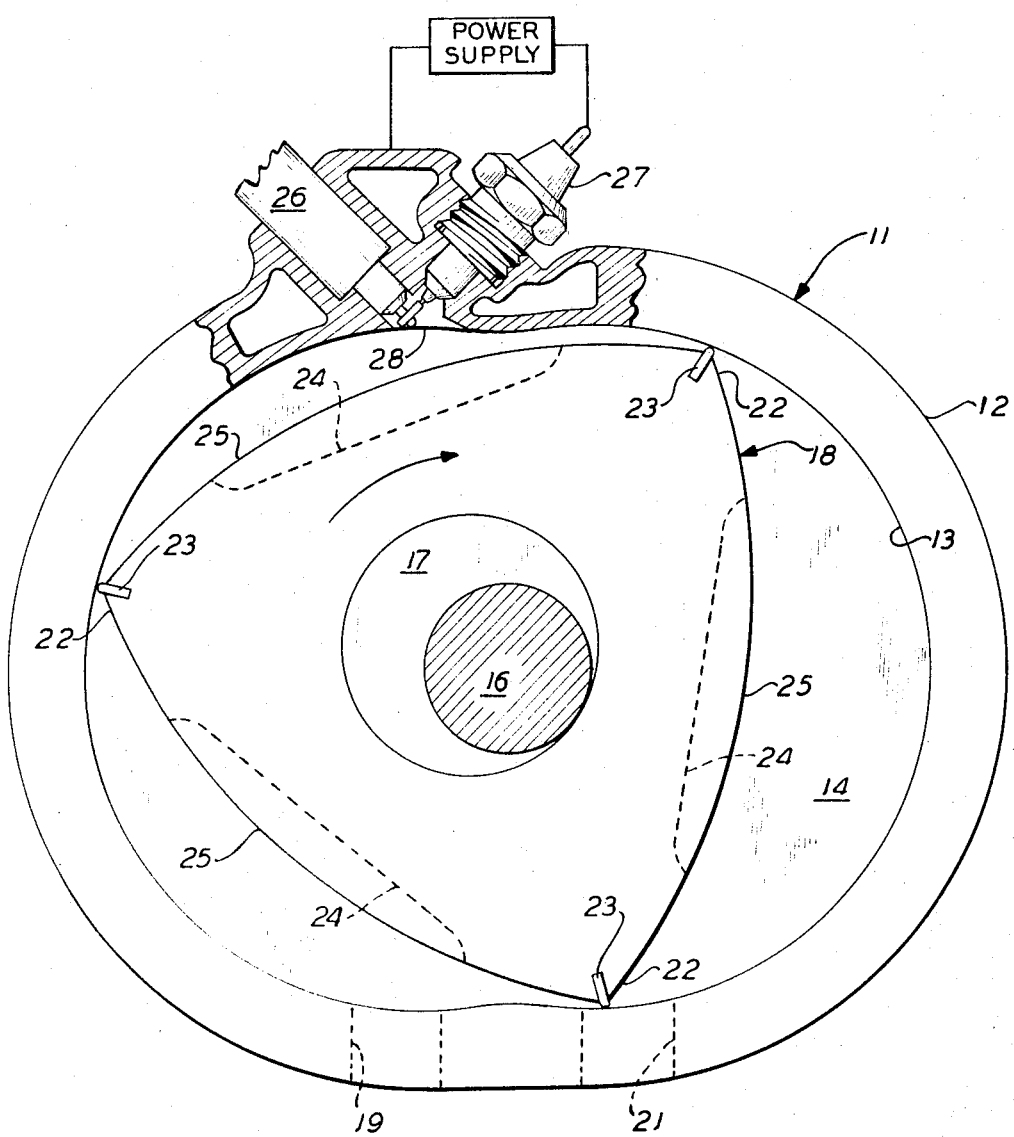
FIG. 1 is an end view, partially in cross-section, of a two-lobed trochoidal rotary engine with one end wall removed, showing the fuel injector and igniting system.

In FIG. 1 there is shown a view of a rotary engine 11 in the axial direction, having a peripheral housing 12 having a two-lobed basically epitrochoidal inner surface 13, parallel end walls 14 of which only the rearmost is shown, a shaft 16 transpiercing the end walls and having an eccentric portion 17 disposed within the engine cavity, and a generally polygonal rotor 18 mounted on the eccentric. The rotor shown has the generally triangular profile with convex arcuate sides which comprises substantially the inner envelope of the two-lobed epitrochoid shown. For epitrochoids having a different number of lobes, the inner envelope will also be generally polygonal and will have one more apex portion than the number of lobes in the epitrochoid.

The engine housing is provided with an intake port 19 for intake of fresh air by rotation of the rotor, and an exhaust port 21. Either or both of the ports may be disposed in the peripheral housing as shown, or in either or both of the end walls, but in any case they will be in the region of the cusp of the epitrochoid formed by the junction of the lobes, and spaced apart by the cusp. Each of the rotor apex portions 22 is provided with an apex seal strip 23 sweeping the inner surface 13 in sealing relationship. Various other sealing elements, bearings, and other appurtenances of such an engine are understood to be present, but not shown here as not being immediately germane to a description of the present invention.

Chambers of variable volume are formed between the housing and each of the three rotor flanks or working faces 25. On rotation of the rotor, fresh air is taken in through port 19 and compressed in the zone of the opposite cusp. Each of the rotor working faces 25 is provided with a recess 24 which assists in determining the compression ratio of the engine, and transfers the gases across the cusp at the junction of the epitrochoidal lobes. The shape of recess 24 and its position in the rotor face 25 may vary according to the design of the engine. The rotor in FIG. 1 is shown approximately at the firing position, that is, in the neighborhood of thirty degrees of shaft angle before reaching full compression at top dead center.

A fuel injector 26 and a spark plug 27 (better shown in FIG. 2) are positioned in intercommunicating recesses in the peripheral wall 12 at the region of the cusp in the compression zone, opposite the intake and exhaust ports, the injector and spark plug recesses intercommunicating in a small cavity at their inner ends having a spark aperture 28 opening to the engine cavity. The injector and spark plug are disposed with their axes at an angle of about 90° to each other, partly so as to bring the injector nozzle 29 and the spark plug electrode 31 into close proximity at the aperture 28, and partly to position the nozzle electrode 32 and the plug electrode 31 in suitable relation to each other. The precise angle is not critical, however, and may be varied within considerable limits. The injector and spark plug may also be side by side in a demountable unit, the electrode 32 being affixed to the injector nozzle after its installation in the unit and before mounting in the housing wall.

As shown, the nozzle and spark plug are positioned somewhat to the upstream side of the cusp of the trochoid, with the fuel spray from nozzle 29 discharging through aperture 28. For certain types of engine operation or with different shapes of the rotor recesses 24 the injector and spark plug assembly may be at other locations in the cusp region, such as somewhat downstream from the cusp, or at the cusp itself. An appropriate power supply, being the ignition system of the engine, has one pole connected to the electrode of the spark plug, the remainder of the engine being at ground with respect to the potential supplied to the plug.

Figure 2:
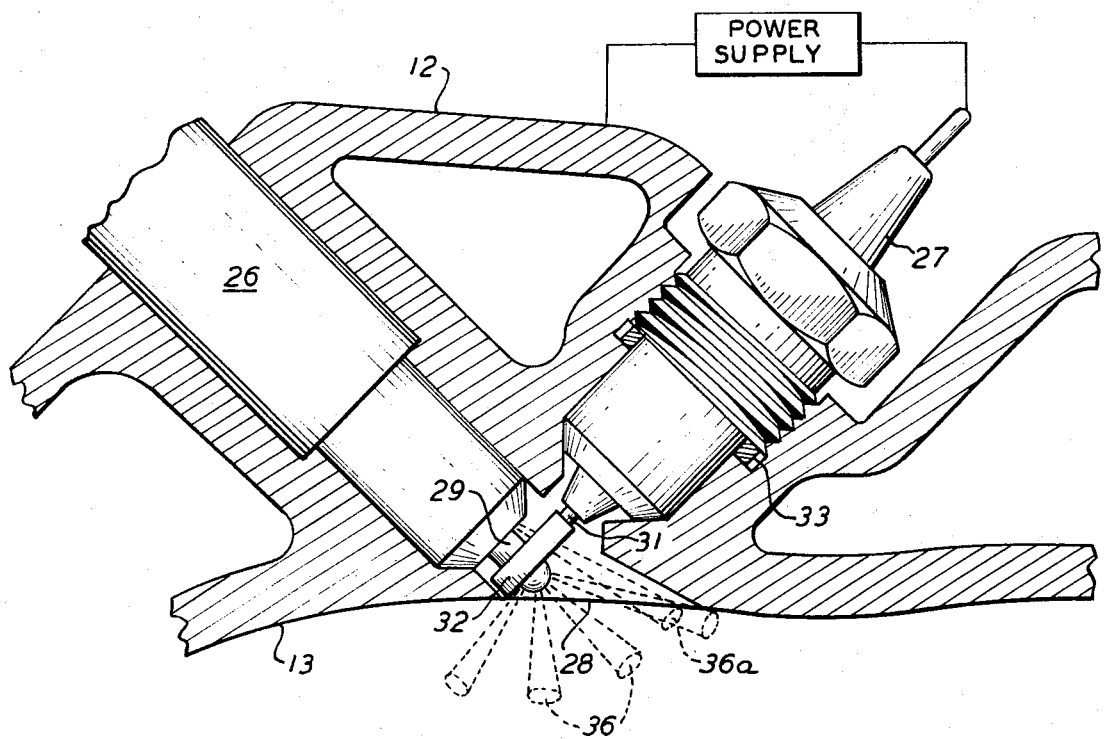
FIG. 2 is an enlarged fragmentary view showing the injecting and igniting arrangement.

As shown on an enlarged scale in FIG. 2, the injector 26 has an apertured spray nozzle 29 disposed at the housing aperture 28 and as close as possible to the housing inner surface 13; the end surface of the nozzle is substantially tangent to the housing inner surface, or at most a few thousandths of an inch removed. The positioning of the spark plug 27 with its axis angularly disposed to the axis of the injector brings the electrode 31 of the plug into close proximity to the spray nozzle 29 and interjacent between the legs of a U-shaped electrode 32 borne by the nozzle 29 (better shown in FIGS. 3 and 4). The plug is screwed down in sealing relation against a gasket 33 positioned against a seat in the spark plug cavity.

This arrangement whereby the nozzle can be placed at the aperture 28 and approximately tangent to the housing inner surface allows aperture 28 to be very small. The injector and spark plug recesses are formed to fit closely to the components contained therein, the spark plug recess being formed to nest the nose of the plug as far as possible, so that the unoccupied volume of the cavity at the communicating ends of the recesses is very small, and any leakage across an apex seal transiting the aperture is minimized.

The nozzle is provided with a plurality of minute orifices 34 through which fuel is sprayed as shown by the schematically indicated jets 36. The number, pattern, size, and angle of discharge of orifices 34 may vary from one engine to another consonant with the fuel requirements of the engine, and according to the positioning of the nozzle upstream or downstream from the cusp, and whether the angle of the injector axis is such that the nozzle is pointed generally in the upstream, downstream, or axial direction. In any case, at least one orifice 34a is so disposed and oriented as to discharge a light-off jet 36a between the legs of electrode 32 and consequently through the path of the spark.

A fuel injection pump (not shown) of a conventional type used in fuel metering systems provides the requisite timing, pressure, and quantity of fuel as required for varying engine operation. Injection normally begins as soon as the leading end of rotor recess 24 in the compression zone has passed the housing aperture 28, and may be of short duration during idling, or may continue until the trailing end of the recess reaches aperture 28 for full load operation. The spark is initiated by the distributor of the ignition system, and is ordinarily timed for the beginning of fuel injection, but the timing may be so adjusted that the spark occurs later during the ignition period, or may have a duration throughout the process of injection or any portion thereof.

Figure 3:
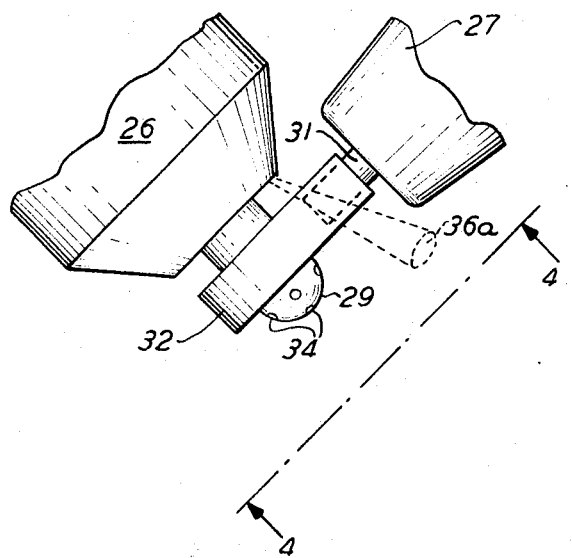
FIG. 3 is a still larger fragmentary view showing portions of the injector and spark plug in their operative relation.
Figure 4:
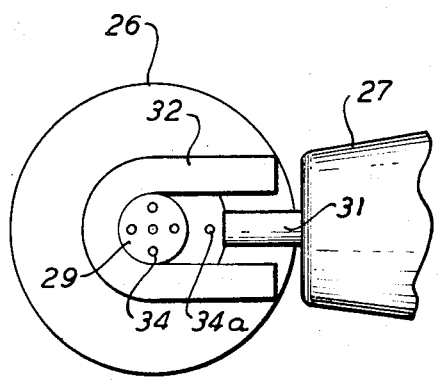
FIG. 4 is a view in the direction of arrows 4—4 of FIG. 3.

FIGS. 3 and 4 particularly show the advantages of the present invention. The U-shaped electrode 32 is wrapped around the injector nozzle 29 and firmly attached thereto at the closed end of the U, as by welding, for instance. Electron beam welding is an appropriate technique for uniting these elements. The legs of the open end of the U project transversely to the axis of the nozzle 29 and straddle electrode 31 of the spark plug; thus, the spark path is between electrode 31 and one or the other of the legs of electrode 32, as may be determined by minute differences in clearance. The gap will ordinarily be from about 0.025 inch to about 0.040 inch, but the optimum may vary according to the type of engine. The spark gap may be adjusted by slight bending of the legs of the U-electrode together or apart to close or open the gap, and orifice 34a of the nozzle discharges the light-off jet 36a directly through the spark gap.

This arrangement does not require high precision in the length of electrode 31 or of the seating depth of the spark plug 27 in its recess in order to obtain an optimum gap. It is only necessary that the distance between the end of electrode 31 and the surface of nozzle 29 should be greater than the gap between electrode 31 and the legs of electrode 32, so that no spark will be fired to the nozzle itself to erode the surface thereof. Further, although the axes of the injector and the spark plug are shown at 90° apart, any other convenient angle which will position electrode 31 interjacent the legs of electrode 32 may be employed.

Spark plug electrodes are commonly formed of nickel-iron alloys, nickel-iron-chromium, nickelmanganese, and similar compositions produced under various trademarks. Injector nozzles are commonly formed of steel. In one of the arrangements disclosed in copending application Ser. No. 299,811, where the spark fired directly to the nozzle, erosion of the nozzle surface might unsuitably enlarge the gap or damage one of the spray orifices, requiring replacement of the injector which is an expensive item. There was also provided a split ring mounted on the nozzle, which ring could be more readily replaced. However, the spark fired to the split ends between which the light-off jet passed, which ends had sharp edges which may erode rapidly, requiring replacement of the ring.

In the present invention the U-shaped electrode 32 is formed of a material having an operating life many times as long as the life of a conventional spark plug electrode, so that the need for replacement of electrode 32 is either very infrequent or non-existent. Iridium of commercial purity (99 percent or better) is a particularly suitable material for electrode 32, having an operating life of the order of a hundred times as long as that of the spark plug. It is, however, the most expensive of the satisfactory materials and is somewhat difficult to fabricate. Platinum-iridium alloys containing at least 10 percent iridium are satisfactory; such alloys having from 10 to 35 percent iridium are commercially available, and higher alloys can be obtained on order.

Certain alloys of other noble metals are also suitable, and have adequate hardness, corrosion resistance, and resistance to spark erosion (arc damage). Following are the compositions of some suitable alloys, it being understood that the percentages stated are nominal and may vary within conventional alloying practice, and that minute amounts of the usual impurities may be present.

EXAMPLE I

Platinum-Iridium Alloys

Any platinum-iridium alloy containing at least 10 percent iridium is suitable.

EXAMPLE II

| Platinum-Palladium-Ruthenium Alloy | |
|---|---|
| Platinum | 84% |
| Palladium | 10% |
| Ruthenium | 6% |

EXAMPLE III

| Platinum-Tungsten Alloy | |
|---|---|
| Platinum | 96% |
| Tungsten | 4% |

Although electrode 32 is shown as having a rectangular cross-section, it may also be a wire of circular cross-section. Its thickness as shown is somewhat exaggerated for clarity of illustration, but since it is a relatively expensive material the lightest weight commensurate with adequate life will normally be used. A thickness of 0.010 to 0.030 inch is ordinarily sufficient.

Although the engine has been described above with the injector and spark plug of a given assembly pair aligned in the circumferential direction, it is also contemplated that the members of the assembly pair may be disposed side by side in the axial direction, the orientation of the nozzle orifices being selected to produce an adequate spray pattern. Further, there may be more than one assembly pair in an engine, according to requirements.

What is claimed is:

1. A rotary internal combustion engine having a housing defining an engine cavity having intake and exhaust ports, a rotor rotatably disposed within the engine cavity and defining with the housing a plurality of working chambers of variable volume, the rotation of the rotor taking in fresh air at the intake port and compressing it in a compression zone, wherein the improvement comprises:

a. the housing having therein a cavity with a spark aperture communicating with the engine cavity, a fuel injector having a nozzle, means for mounting said fuel injector with the nozzle positioned in the housing cavity in proximity to the spark aperture and oriented to inject fuel into the compression zone therethrough, the nozzle bearing a U-shaped electrode with the legs of the U extending therefrom, a spark plug with an electrode projecting therefrom, means for mounting said spark plug with said electrode extending interjacent the legs of the U-shaped electrode and forming a spark gap therewith; and b. an ignition system having one pole connected to the spark plug electrode and the other pole connected to the engine body so that the spark plug electrode and the U-shaped electrode are at opposite polarities, the ignition system firing a spark across the spark gap during the period of fuel injection.

2. The combination recited in claim 1, wherein the spray nozzle has a plurality of orifices oriented to direct a plurality of fuel jets in various directions into the compression zone, one of the nozzle orifices being oriented to direct a fuel jet between the legs of the U-shaped electrode.

3. The combination recited in claim 2, wherein the extending legs of the U-shaped electrode are deformable to alter the dimension of the spark gap.

4. The combination recited in claim 3, wherein the U-shaped electrode is formed of a material selected from the group consisting of iridium, platinum-iridium alloy, platinum-palladium-ruthenium alloy, and platinum-tungsten alloy.

5. The combination recited in claim 4, wherein the U-shaped electrode is formed of iridium of at least commercial purity.

6. The combination recited in claim 4, wherein the U-shaped electrode is formed of platinum-iridium alloy containing at least 10% iridium.

7. The combination recited in claim 4, wherein the U-shaped electrode is formed of an alloy consisting of approximately 84 percent platinum, 10 percent palladium, and 6 percent ruthenium.

8. The combination recited in claim 4, wherein the U-shaped electrode is formed of an alloy consisting of approximately 96 percent platinum and 4 percent tungsten.

* * * * *